US005882474A

United States Patent [19]

Gomes et al.

[11] Patent Number: 5,882,474

[45] Date of Patent: Mar. 16, 1999

[54] LABELING MACHINE WITH RADIAL MOTION TURRET

[75] Inventors: Gary G. Gomes, Winton; Joe C. Parker, Turlock, both of Calif.

[73] Assignee: B&H Manufacturing Company, Inc., Ceres, Calif.

[21] Appl. No.: 874,178

[22] Filed: Jun. 13, 1997

[51] Int. Cl.[6] .............................. B32B 31/00; B65C 9/00

[52] U.S. Cl. .......................... 156/556; 156/566; 156/567; 156/456

[58] Field of Search .................................... 156/556, 566, 156/567, 571, 456, 446, 215

[56] References Cited

U.S. PATENT DOCUMENTS

| | | | |
|---|---|---|---|
| 4,108,709 | 8/1978 | Hoffmann | 156/446 |
| 4,108,710 | 8/1978 | Hoffmann | 156/450 |
| 4,181,555 | 1/1980 | Hoffmann | 156/265 |
| 4,336,095 | 6/1982 | Hoffmann | 156/361 |
| 4,629,389 | 12/1986 | Kontz | 414/433 |
| 4,798,648 | 1/1989 | Freeman | 156/556 X |
| 4,872,931 | 10/1989 | Mitchell | 156/86 |
| 4,931,131 | 6/1990 | Thompson | 156/556 |
| 5,037,499 | 8/1991 | Bright et al. | 156/456 |
| 5,091,040 | 2/1992 | Otruba | 156/566 |
| 5,269,864 | 12/1993 | Otruba | 156/215 |
| 5,271,793 | 12/1993 | Seifert et al. | 156/566 |
| 5,290,388 | 3/1994 | Zepf | 156/447 |
| 5,321,933 | 6/1994 | Seifert et al. | 53/415 |
| 5,351,426 | 10/1994 | Voy et al. | 40/638 |

*Primary Examiner*—James Engel
*Attorney, Agent, or Firm*—Brooks & KushmanP.C.

[57] ABSTRACT

A labeling machine for labeling a plurality of containers is disclosed. The labeling machine includes a loading mechanism that sequentially receives containers and discharges containers in a spaced relationship. A star wheel has a plurality of receptacles disposed about the periphery of the star wheel, and is rotatable around an axis of rotation. The star wheel sequentially receives containers from the loading mechanism. The receptacles are pivotally secured to the star wheel for limited radial and pivotal movement. The receptacles have a leading end and a trailing end relative to the direction of rotation of the star wheel. A label dispenser including a label holder is disposed adjacent the periphery of the star wheel. The label has a decorated side facing the dispenser and an adherent side facing the star wheel. Each container is fed by the loading mechanism to one of the receptacles that grips the container as it is rotated around the star wheel until it reaches a pick-up point where the container contacts the adherent side of the label causing the label to adhere to the container. The leading end and trailing end of the receptacle alternately extend radially and retract radially to adjust for changes in a contoured surface of the container relative to the axis of rotation of the star wheel as the star wheel rotates the container past the label dispenser.

12 Claims, 3 Drawing Sheets

LABELING MACHINE WITH RADIAL MOTION TURRET

TECHNICAL FIELD

The present invention relates to container labeling machines.

BACKGROUND ART

Different labeling systems have been developed for labeling containers. For example, pressure-sensitive labels, roll-fed labels and magazine-fed labels may be applied in conjunction with glues or solvents to apply labels to a wide variety of containers including glass bottles, cans, plastic containers and laminated composite containers.

Pressure-sensitive labels are frequently provided with a web-backing that is used to protect the pre-applied adhesive layer on the back of the label and prevent the label from adhering to other labels prior to application of the pressure-sensitive label. When labeling with this type of label, it is necessary to handle both the label and the web-backing.

Generally, pressure-sensitive labels are formed from relatively thick label stock that can be extended out in an unsupported manner by a labeling machine for pick-up by a container as it passes by the label. Direct contact is required between the label and backing throughout the labeling process until the label is applied to the container. When the label is extended for adherence to the container, problems arise relating the lack of control of the label. This disadvantage is frequently compensated for by running the labeling operation at low speeds, for example 100 containers per minute.

Pressure-sensitive labels are the label of choice when it is necessary to label contoured containers such as shampoo bottles, cleaning supplies, laundry products, and the like. Prior to the present invention, it has been difficult to label contoured (non-cylindrical) containers utilizing roll-fed labels or magazinefed labels having a leading and trailing edge or other glue patterns.

Roll-fed labels and magazine-fed labels are well-suited for application to cylindrical containers requiring a partial or full wrap label. Straightthrough label machines and turret-style machines have been developed to apply labels to cylindrical containers at high speeds wherein the containers are rotated past a label application mechanism such as a magazine or vacuum drum which supports the label during the label transfer process. Oblong, oval, or other non-cylindrical containers are difficult to handle on roll-through labelers and complicate the construction of turret-style labelers.

These and other disadvantages and problems associated with prior art labeling systems are addressed by applicant's invention as summarized below.

SUMMARY OF INVENTION

It is an object of the invention to provide a cost-effective system for labeling contoured, noncylindrical containers with pressure-sensitive or glueapplied labels utilizing either roll-fed or magazine-fed labels.

It is another object of the invention to provide a labeling system that achieves full contact between the label and the container being labeled throughout the label transfer process.

It is also an object to provide a simplified machine design which is flexible in that it can be adapted to label a wide variety of container shapes.

It is another object of the invention to provide a labeling system wherein new pressure-sensitive label materials can be used that do not require backing. The invention can also use pressure-sensitive labels that have backing material, if required.

It is also an object of the invention to provide a labeling system which broadens labeling alternatives and frees container designers to develop new and attractive container shapes.

It is an object of the invention to provide a labeling system which can operate at higher speeds, exceeding 300 containers per minute while applying pressure-sensitive labels or adhesive-applied labels to contoured, non-cylindrical containers.

According to the present invention, a labeling machine for labeling a plurality of containers is provided wherein a loading mechanism sequentially receives containers and discharges containers in a spaced relationship. A star wheel having a plurality of receptacles disposed about the periphery of the star wheel is rotated around an axis of rotation. The star wheel sequentially receives containers from the loading mechanism and receptacles that are secured to the star wheel for limited radial and pivotal movement. The receptacles have a leading and trailing end relative to the direction of rotation of the star wheel. A label dispenser is provided which has a label holder disposed adjacent the periphery of the star wheel to hold the label to be applied to one of the containers. The label has a decorated side facing the dispenser and an adherent side facing the star wheel. Each container is fed by the loading mechanism to one of the receptacles that grips the container as it is rotated around the star wheel until it reaches a pick-up point where the container contacts the adherent side of the label causing the label to adhere to the container. The leading end and trailing end of each receptacle alternately extends radially and retracts radially to adjust for changes in a contoured surface of the container relative to the axis of rotation of the star wheel as the star wheel rotates the container past the label dispenser.

According to another aspect of the invention, the above labeling machine may feature receptacles that rotate the container in an arcuate path that is not coincident with or related to the arcuate path the container follows as it is rotated about the star wheel. The receptacles hold the container against the label from the pick-up point to a release point where the label is fully secured to the container and is released from the label dispenser.

According to the present invention, the loading mechanism may be a loading star wheel, a feed screw or an accumulating conveyor with a flow gate.

According to another aspect of the invention, the star wheel is provided with a cam and cam follower assembly that controls the radial and pivotal movement of the receptacles.

According to another aspect of the invention, the star wheel of the labeling machine described above may have a cam and two cam follower assemblies operatively associated with the star wheel that controls the pivotal and radial movement of the receptacles independently.

Alternatively, the receptacles may be secured to the star wheel by pneumatic actuators or servo motors for controlling the radial and pivotal movement of the receptacles. According to another aspect of the invention, the labeling machine described above may be provided with a label dispenser having a cut and stack label applicator head, a die cutter anvil, a pressuresensitive label applicator head adapted to peel off the web-backing, or a print wheel adapted to print directly on the container as it is retained in one of the pockets of the star wheel.

These and other objects and advantages of the present invention will be better understood upon review of the attached drawings and detailed description of the invention.

BEST MODE FOR CARRYING OUT THE INVENTION

Figure 1:
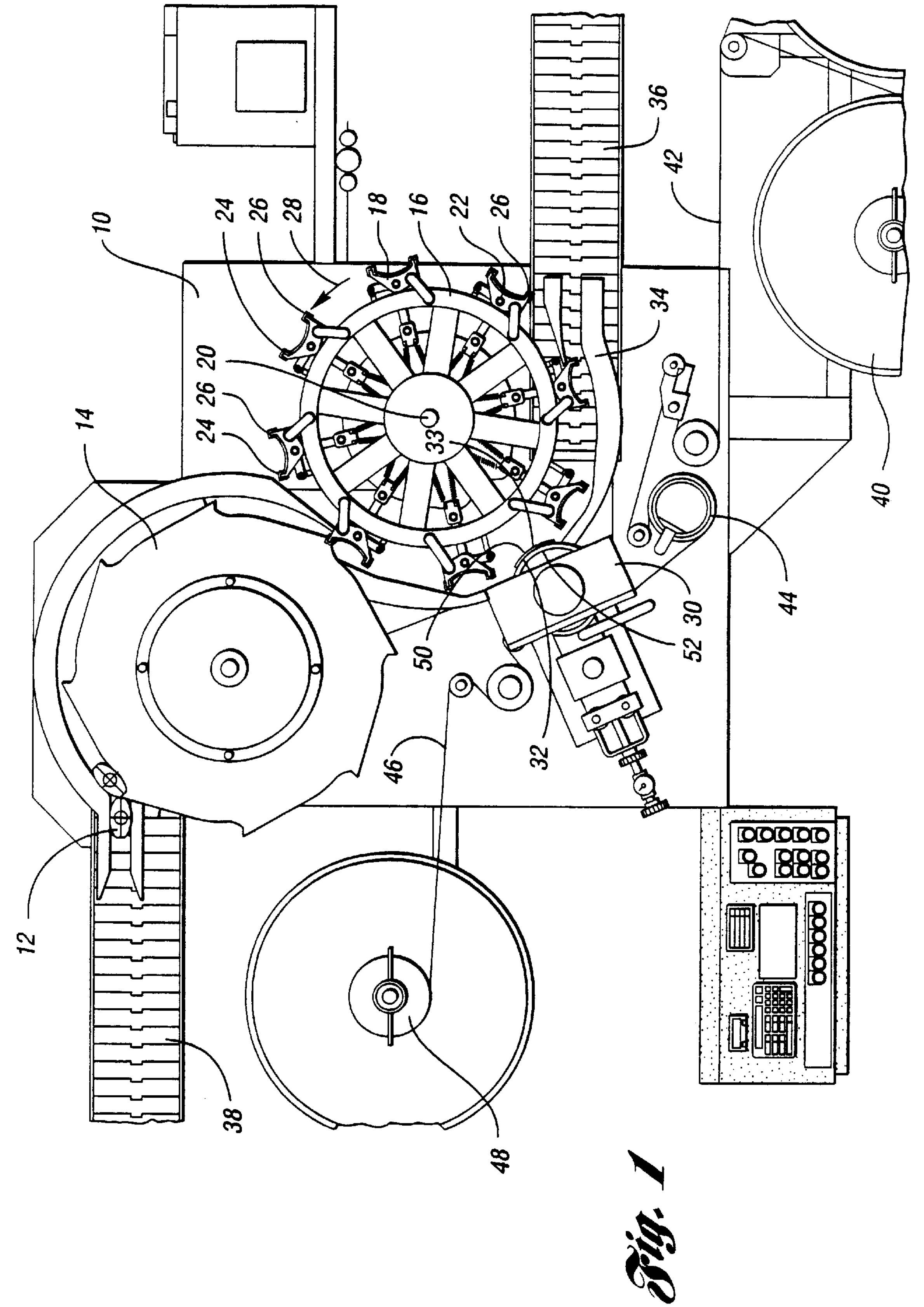
FIG. 1 is a top plan view of a labeling machine with a radial motion turret made in accordance with the present invention.

Referring now to FIG. 1, the labeling machine 10 of the present invention is shown set up to label containers 12. Containers 12 are picked up by a loading mechanism 14 comprising a loading star wheel that feeds the containers to the radial motion turret 16 that also may be referred to as a star wheel.

The radial motion turret 16 is provided with a plurality of receptacles 18. Receptacles 18 are pivotable and radially extendable and retractable. The radial motion turret 16 has an axis of rotation 20. The receptacles 18 are secured by a pivot pin 22 which permits the receptacles 18 to be pivotably mounted relative to the radial motion turret 16. The receptacles 18 each have a leading end 24 and a trailing end 26 which are defined relative to the direction of rotation shown by arrow 28 of the radial motion turret 16.

Labels are applied by a die cutter 30 as shown in FIG. 1. The invention can also be practiced by using a pressure sensitive label applicator head, a cut and stack labeling magazine, a roll-fed labeler having a vacuum drum, or by incorporating a printer that prints directly on the container. The anvil 32 of the die cutter 30 also acts as a label holder holding a label 33. Equivalent label holders may include vacuum drums, label magazines and printer heads. After After labeling, the radial motion turret 16 rotates until the container reaches discharge guide rail 34 which separates the containers 12 from the radial motion turret 16 and allows them to be fed to discharge conveyor 36. The containers are fed into the labeling machine 10 by an in-feed conveyor 38.

In FIG. 1, the loading mechanism disclosed is a star wheel 14. However, it is also possible to utilize a feed screw or an accumulating conveyor with a flow gate that is capable of providing one container at a time to the receptacles 18 on the radial motion turret 16.

As shown in FIG. 1, a label roll 40 is provided so that labels can be simply and cost effectively supplied in roll form. The roll fed label material may be pressure sensitive label material including a backing or may be a linerless pressure sensitive label such as Cenex Monoweb which is available from CCL Label of Sioux Falls, S. Dak. The Cenex Monoweb is a preferred pressure sensitive material because more labels can be provided per roll due to the omission of the backing material. Also, cost savings associated with elimination of the backing material may be significant with larger label sizes. By providing more labels per roll, more time can be provided between roll change resulting in machine operation efficiencies.

A label web 42 is pulled from label roll 40 by a feed roller 44 and fed to the die cutter 30. Labels can be provided to the label applicator in a pre-cut form or can be cut by the die cutter 30 just prior to application. The skeleton label waste is shown at 46 as it is removed from the die cutter 30 and collected on roll 48. The web backing from pressure sensitive label material could be removed from the applicator and collected on roll 48. The label 33 has an adherent side 50 and decorated side 52. The adherent side 50 may be completely coated with pressure sensitive adhesive or may be partially or fully coated with a hot melt adhesive or solvent material which renders the label 33 adherent so that it can be picked up by the container 12 as it passes the anvil 32 or other label holder while on the radial motion turret 16.

Figure 2:
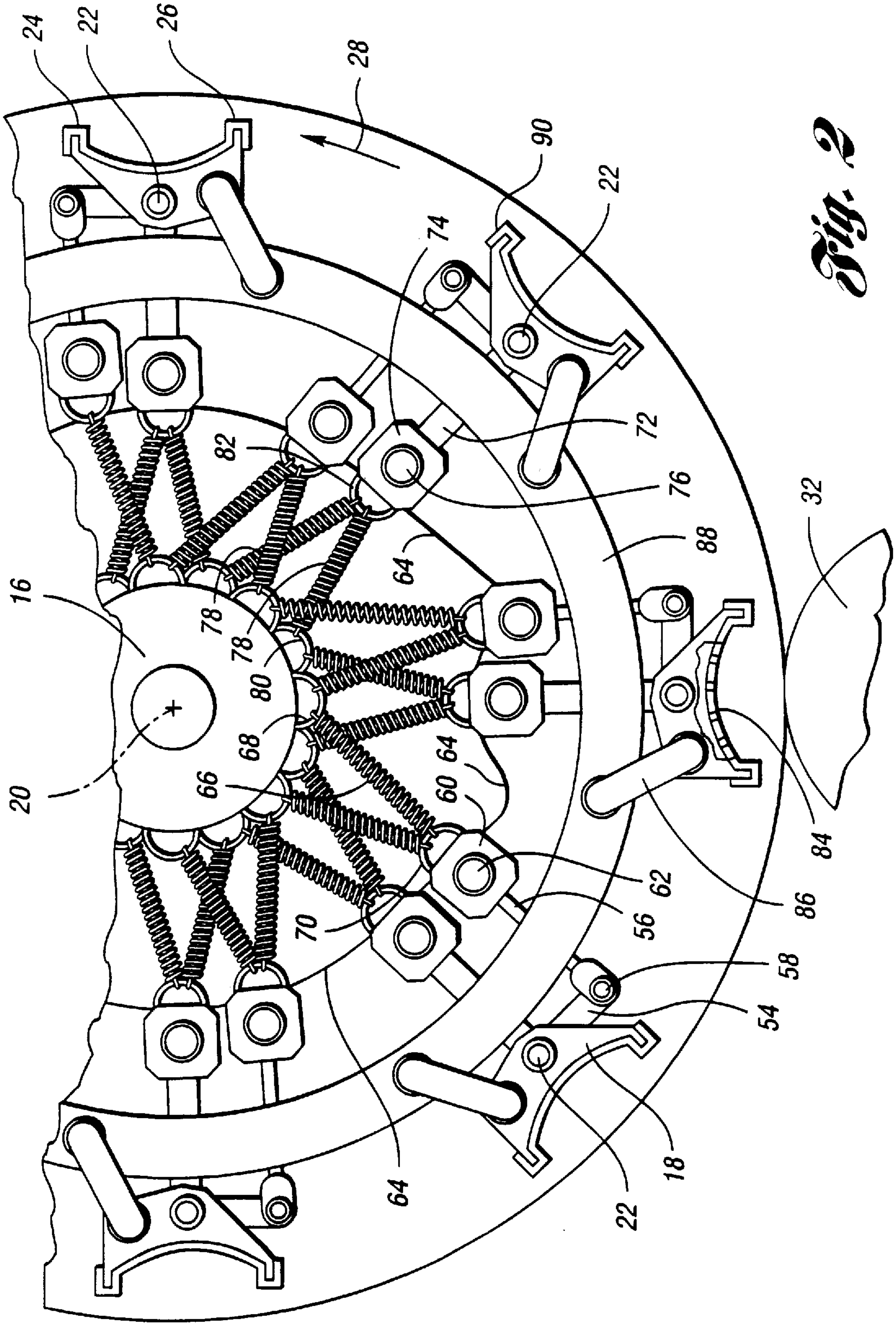
FIG. 2 is a fragmentary top plan view of a radial motion turret made in accordance with the present invention.

Referring now to FIG. 2, the structure of the radial motion turret 16 will be described in more detail. The receptacles 18 are supported on the periphery of the radial motion turret 16 in a pivotable relationship on pivot pin 22. A rocker arm 54 is secured to the receptacle 18 and cam follower connecting rod 56 by means of a pivot connector 58. The rocker arm 54 causes the receptacle 18 to pivot the receptacle 18 about pivot 22. The pivoting motion of the receptacle for an oblong container having a curved labeling surface will be described below as an example with reference to FIG. 3.

Cam follower connecting rod 56 interconnects the rocker arm 54 to the cam follower 60. Cam follower 60 has a bearing 62 which rotatably engages the cam 64. Cam 64 is held in place by retention springs 66. Retention springs 66 interconnect retention rings 68 on the radial motion turret 16 and retention rings 70 on the cam follower 60. The receptacles 18 are connected by pivot pin 22 to cam follower connector rod 72. Cam follower connecting rod 72 moves the receptacles 18 radially inwardly and outwardly based upon the path of movement dictated by the cam 64. Cam follower 74 has a bearing 76 which rotatably engages the cam 64. Cam follower 74 is connected by retention springs 78 to retention rings 80 on the radial motion turret 16 and retention ring 82 on the cam follower 74.

Containers 12 are retained on the radial motion turret 16 preferably by means of vacuum. Vacuum is supplied through vacuum ports 84 formed in the receptacles 18. A flex vacuum hose 86 interconnects the vacuum ports 84 to a vacuum ring 88. Vacuum ring 88 is connected to a source of vacuum (not shown) . The vacuum in the vacuum ring 88 is communicated by the flex vacuum hose 86 to the vacuum ports 84 which is used to releasably hold containers 12 within the receptacles 18. Instead of or in conjunction with a vacuum retention system, a friction gripping layer 90 can be provided on the receptacles 18. An appropriate friction-gripping layer would be an elastomeric material which is resilient so that when a container 12 is forced into the receptacle 18, the friction gripping layer 90 compresses and then grips the container 12.

Figure 3:
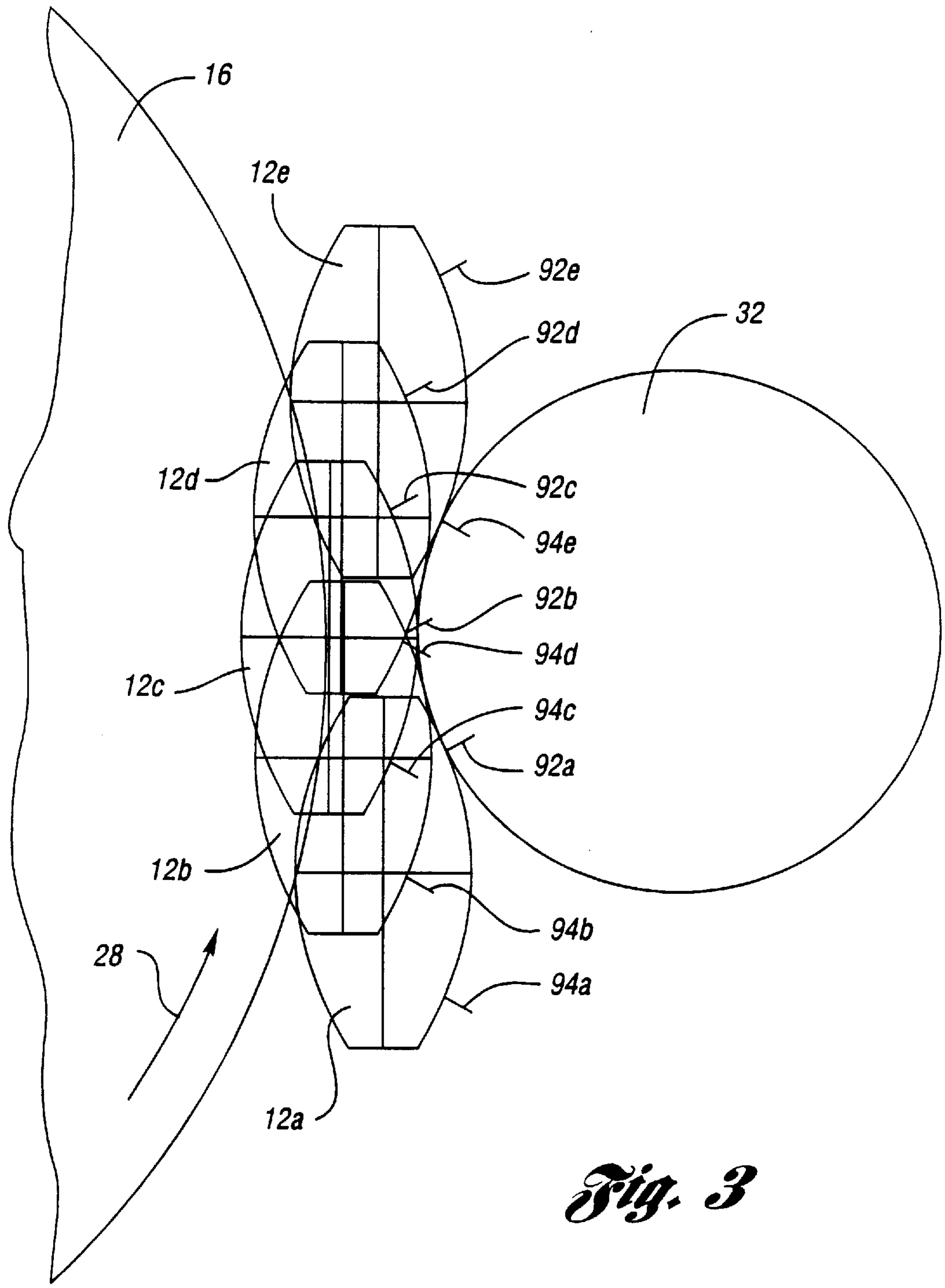
FIG. 3 is a diagrammatic view showing five stages of the label transfer operation.

Referring now to FIG. 3, movement of the container 12 on the star wheel 16 through the engagement with the anvil 32 is shown in five stages identified by reference numerals 12*a*–12*e*. The leading edge of the label or pick-up point is identified by reference numeral 92*a*–92*e* as it progresses through the labeling cycle. The label end or release point is identified by reference numeral 94*a*–94*e*.

When the container is in the position shown as 12*a*, the leading edge of the label is at 92*a* which is the pick-up point. At this point, the container is held by the receptacle 18 so that the receptacle is at its maximum point of extension on cam follower connecting rod 72 relative to the radial motion turret 16. The rocker arm 54 is positioned by the cam follower connecting rod 56 so that the trailing end 26 of the receptacle is at maximum extension while the leading end 24 is retracted.

The labeling process continues through the position shown at 12*b* wherein the cam following connecting rod retracts the receptacle 18 while the rocker arm 54 is rotating the receptacle 18 so that the trailing end is less extended and the leading end is beginning to extend radially outwardly.

At the position shown at 12*c*, the cam follower connecting rod 72 is at its minimum radial extension position and the rocker arm 54 holds the receptacle 18 with the leading end 24 and trailing end 26 essentially equally extended.

Progressing to the position shown by the container at 12*d*, the cam follower connecting rod 72 is again extending radially outwardly, while the leading end 24 of the receptacle 18 is being radially extended.

Finally, in the position shown as 12*e*, the cam follower connecting rod 72 extends the receptacles 18 to the maximum extent, while the rocker arm 54 pivots the receptacle 18 so that the leading end 24 is at its maximum radial extension, while the trailing end is pivoted toward the radial motion turret 16.

As will be readily appreciated by one of ordinary skill in the art, the radial extension and pivoting motion of the receptacles 18 can be controlled by one or more cams to provide precise control of the positioning of the containers 12 relative to the anvil 32. The objective of providing constant contact between the label 33 and container 12 is achieved with a simple cam and cam follower mechanism that can be precisely timed and coordinated with the label application process. Ideally, the container 12 can be controlled to maintain tangential perpendicularity between the surface of the container and the surface of the anvil, even though the two surfaces are on different arcs. As will be readily appreciated, the axis of the container moves radially in the disclosed embodiment, but may also be held in a fixed relationship, depending on the container configuration.

The present invention has been described with regard to the preferred embodiment above. The foregoing description should be read as an example of the best mode of practicing the invention but should not be read in a limiting sense. The broad scope of Applicant's invention should be construed by reference to the following claims.

What is claimed is:

1. A labeling machine for labeling a plurality of containers comprising:

a loading mechanism that sequentially receives containers and discharges containers in a spaced relationship;

a star wheel having a plurality of receptacles disposed about the periphery of the star wheel, the star wheel being rotatable around an axis of rotation, the star wheel sequentially receiving containers from the loading mechanism, each receptacle being attached to the star wheel by a pivotable attachment mechanism arranged to be interactive with a cam located on the star wheel to produce limited radial and pivotal movement, the receptacles having a leading end and a trailing end relative to the direction of rotation of the star wheel;

a label dispenser having a label holder disposed adjacent the periphery of the star wheel for holding a label to be applied to one of the containers, the label having an adherent side facing the star wheel;

wherein each container is fed by the loading mechanism to one of the receptacles that grips the container as it is rotated around the star wheel until it reaches a pick-up point where the container contacts the adherent side of the label causing the label to adhere to the container, the leading end and trailing end of the receptacle alternately extend radially and retract radially responsive to the interaction of the pivotable attachment mechanism and the cam to adjust for changes in a contoured surface of the container relative to the axis of rotation of the star wheel as the star wheel rotates the container past the label dispenser.

2. The labeling machine of claim 1 wherein the pivotable attachment mechanism is arranged relative to the star wheel to cause the receptacles to arcuately rotate the container in an arcuate path that is not coincident with the arcuate path the container follows as it is rotated about the star wheel to hold the container against the label from the pick-up point to a release point where the label is fully secured to the container and released from the label dispenser.

3. The labeling machine of claim 1 wherein the loading mechanism is a loading star wheel.

4. The labeling machine of claim 1 wherein the pivotable attachment mechanism comprises a cam follower assembly operatively associated with the cam located on the star wheel to control the radial and pivotal movement of the receptacles.

5. The labeling machine of claim 1 wherein the label dispenser is a die cutter that rotates the label as the container is moved by the star wheel past the die cutter.

6. The labeling machine of claim 1 wherein the label dispenser is a pressure sensitive label applicator head.

7. The labeling machine of claim 1 wherein the receptacles have vacuum ports for temporarily securing the container within the receptacle.

8. The labeling machine of claim 1 wherein the receptacles are provided with a layer of material that holds the container frictionally within the receptacle.

9. A labeling machine for labeling a plurality of containers comprising:

an infeed conveyor feeding the containers to the labeling machine;

a loading star wheel that sequentially receives containers from the infeed conveyor and discharges containers in a spaced relationship;

a turret having a plurality of receptacles disposed about the periphery of the turret, the turret being rotatable around an axis of rotation, the turret sequentially receiving containers from the loading star wheel, the receptacles being secured by a pivot pin to a cam follower connecting rod having a cam follower that is adapted to follow a cam that is secured to the turret, the receptacles each having a leading end and a trailing end relative to the direction of rotation of the star wheel;

a plurality of rocker arms each being secured to one of the receptacles and a cam follower by a cam follower connecting rod, the cam follower being adapted to follow the cam that is secured to the turret, the rocker arms pivoting the receptacles in a limited arcuate path about the pivot pin;

a label dispenser having a cylindrical label holder disposed adjacent the periphery of the star wheel for holding a label to be applied to one of the containers, the label having a decorated side facing the dispenser and an adherent side facing the star wheel;

wherein each container is fed by the loading star wheel to one of the receptacles that grips the container as it is rotated around the star wheel until it reaches a pick-up point where the container contacts the adherent side of the label causing the label to adhere to the container, the leading end of the receptacles pivoting toward the turret prior to label pick up and trailing end of the receptacle pivoting toward the turret throughout the label application operation until the label is released from the label dispenser to adjust for changes in a contoured surface of the container relative to the axis of rotation of the turret as the turret rotates the container past the label dispenser.

10. A labeling machine for labeling a plurality of containers comprising:

a loading mechanism that sequentially receives containers and discharges containers in a spaced relationship;

a star wheel having a plurality of receptacles disposed about the periphery of the star wheel, the star wheel being rotatable around an axis of rotation, the star wheel sequentially receiving containers from the loading mechanism, each receptacle being attached to the star wheel by a means for limiting radial and pivotal movement relative to the rotation of the star wheel, the receptacles having a leading end and a trailing end relative to the direction of rotation of the star wheel;

a label dispenser having a label holder disposed adjacent the periphery of the star wheel for holding a label to be applied to one of the containers, the label having an adherent side facing the star wheel;

wherein each container is fed by the loading mechanism to one of the receptacles which is rotated by the star wheel into contact with the adherent side of the label at a pick-up point causing the label to adhere to the container, the leading end and trailing end of the receptacle being alternately extended radially and retracted radially by the means for limiting radial and pivotal movement to maintain a contoured surface of the container in contact the label dispenser as the container is rotated by the star wheel.

11. The labeling machine of claim 10 wherein the label dispenser is a pressure sensitive label applicator head.

12. The labeling machine of claim 10 wherein each receptacle comprises a vacuum port for temporarily securing the container within the receptacle.

* * * * *